(12) United States Patent
Sauer

(10) Patent No.: US 10,549,676 B2
(45) Date of Patent: Feb. 4, 2020

(54) SUPPORT CHOCK

(71) Applicant: Vernon Claude Sauer, Cold Spring, MN (US)

(72) Inventor: Vernon Claude Sauer, Cold Spring, MN (US)

(*) Notice: Subject to any disclaimer, the term of this patent is extended or adjusted under 35 U.S.C. 154(b) by 0 days.

(21) Appl. No.: 15/356,699

(22) Filed: Nov. 21, 2016

(65) Prior Publication Data

US 2017/0144583 A1 May 25, 2017

Related U.S. Application Data

(60) Provisional application No. 62/258,047, filed on Nov. 20, 2015.

(51) Int. Cl.
*B60P 7/12* (2006.01)

(52) U.S. Cl.
CPC ........................ *B60P 7/12* (2013.01)

(58) Field of Classification Search
CPC ............ B60P 7/12; B60P 7/0892; B60T 3/00
See application file for complete search history.

(56) References Cited

U.S. PATENT DOCUMENTS

| | | | |
|---|---|---|---|
| 823,869 A | 6/1906 | Hussey | |
| 884,661 A | 4/1908 | Howe | |
| 991,736 A | 5/1911 | Minnick | |
| 2,630,192 A * | 3/1953 | Stenhouse | B60T 3/00 188/32 |
| 2,862,579 A * | 12/1958 | Jicha | B60T 3/00 188/32 |
| 3,065,827 A * | 11/1962 | Timbers | B60T 3/00 188/32 |
| 3,091,348 A | 5/1963 | Neuhauser | |
| 3,289,794 A * | 12/1966 | Miles | B60T 3/00 188/32 |
| 3,379,314 A * | 4/1968 | Canning | B63C 5/04 211/59.4 |
| 3,590,752 A | 7/1971 | DePew | |
| 3,647,029 A * | 3/1972 | Hanley | B60T 3/00 188/32 |
| 3,734,281 A | 5/1973 | Armstrong | |
| 3,858,690 A * | 1/1975 | Facemire | B60T 3/00 188/32 |
| 4,186,823 A * | 2/1980 | White, Jr. | B60T 3/00 188/32 |
| 4,565,289 A | 1/1986 | Lesueur | |
| 4,729,537 A | 3/1988 | Turner et al. | |
| 5,123,547 A | 6/1992 | Koch | |

(Continued)

FOREIGN PATENT DOCUMENTS

| | | |
|---|---|---|
| CN | 203819731 | 9/2014 |
| DE | 202013102811 U1 | 3/2014 |
| GB | 8122429 | 1/1983 |

*Primary Examiner* — Anita M King
(74) *Attorney, Agent, or Firm* — Steven M. McHugh; Law Offices of Steven McHugh, LLC

(57) ABSTRACT

A support chock is provided and includes a chock front, a chock rear, a chock top, a chock bottom and a plurality of chock sides, wherein the chock top, chock bottom and plurality of chock sides define a chock cavity, a chock front opening and a chock rear opening, wherein the chock cavity communicates the chock front opening with the chock rear opening.

18 Claims, 26 Drawing Sheets

(56) References Cited

U.S. PATENT DOCUMENTS

| | | | |
|---|---|---|---|
| 5,193,700 A * | 3/1993 | Lyman | B60P 7/12 |
| | | | 206/386 |
| 5,444,949 A * | 8/1995 | Ciaccio | B60T 3/00 |
| | | | 188/32 |
| 5,649,632 A | 7/1997 | Terashima et al. | |
| 6,119,861 A | 9/2000 | Schneider | |
| 6,261,037 B1 | 7/2001 | Richards et al. | |
| 6,390,245 B1 * | 5/2002 | Metz | B60T 3/00 |
| | | | 188/32 |
| 6,474,613 B2 | 5/2002 | O'Malley | |
| 6,685,021 B2 | 2/2004 | Dodson et al. | |
| 6,997,330 B2 | 2/2006 | Pachao-Morbitzer et al. | |
| 7,080,864 B2 | 7/2006 | Casteran | |
| 7,168,527 B2 * | 1/2007 | Bateman | B60T 3/00 |
| | | | 188/32 |
| 8,882,054 B1 | 11/2014 | Maki et al. | |
| 8,985,529 B2 | 3/2015 | Masters et al. | |
| 2004/0164209 A1 | 8/2004 | Pachao-Morbitzer et al. | |

* cited by examiner

SECTION A-A

SUPPORT CHOCK

CROSS REFERENCE TO RELATED APPLICATIONS

This application is related to and claims benefit of priority of the filing date of U.S. Provisional Patent Application Ser. No. 62/258,047, filed Nov. 20, 2015, the content of which is incorporated herein by referenced in its entirety.

FIELD OF THE INVENTION

The present invention relates to a support device for piping and other articles and more particularly to a support chock for stabilizing piping and other articles during transport and storage.

BACKGROUND OF THE INVENTION

As is known, piping, tubing and other cylindrically shaped articles are commonly stored at and shipped from its place of manufacture to a place where the piping, tubing or cylindrically shaped articles are used or processed. During this storage and/or shipping it is common practice for the piping, tubing and/or articles to be stacked in layers on a flat deck trailer requiring the use of a support chock to provide lateral stability to the bottom layer and prevent/limit side to side movement and/or a shipping truck or railroad car.

And because the piping, tubing or cylindrically shaped articles are subject to lateral rolling movement, any agitation of the stack may cause the piping, tubing or cylindrically shaped articles to shift and/or roll off of the board or timber and the entire stack may rapidly collapse. This is undesirable because the piping, tubing or cylindrically shaped articles may have a substantial weight component and, once the stack becomes unstable, the piping, tubing or cylindrically shaped articles may begin to roll and rapidly gathering momentum. This can cause the shipping vehicle to become unbalance thereby causing an accident. Additionally, this can be extremely dangerous to nearby people and property.

In order to overcome this problem, the stack should be stabilized so that rolling and other movement of the piping, tubing or cylindrically shaped articles is avoided, both during shipment and storage. One way this stabilization has been accomplished is by using one or more chocks to prop up and prevent the stack from rolling and other lateral movement. For example, one type of chock includes securely nailing a large block of wood, such as a 2×4, to the subjacent board next to each end of each row or layer of piping, tubing or cylindrically shaped articles. This prevents the piping, tubing or cylindrically shaped articles from rolling or other lateral movement. Unfortunately however, this type of chock is difficult to install and remove this chock if ever it becomes necessary or desirable to vary the number of pipe lengths in a given row or if it is desired to reuse the chock boards after the pipes have been removed. While other types of chocks that don't utilize a nail or securing element are available, these chocks are not structural in nature and do not provide a safe and positive method of securing the piping, tubing or cylindrically shaped articles and/or preventing/limiting movement.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 10A:
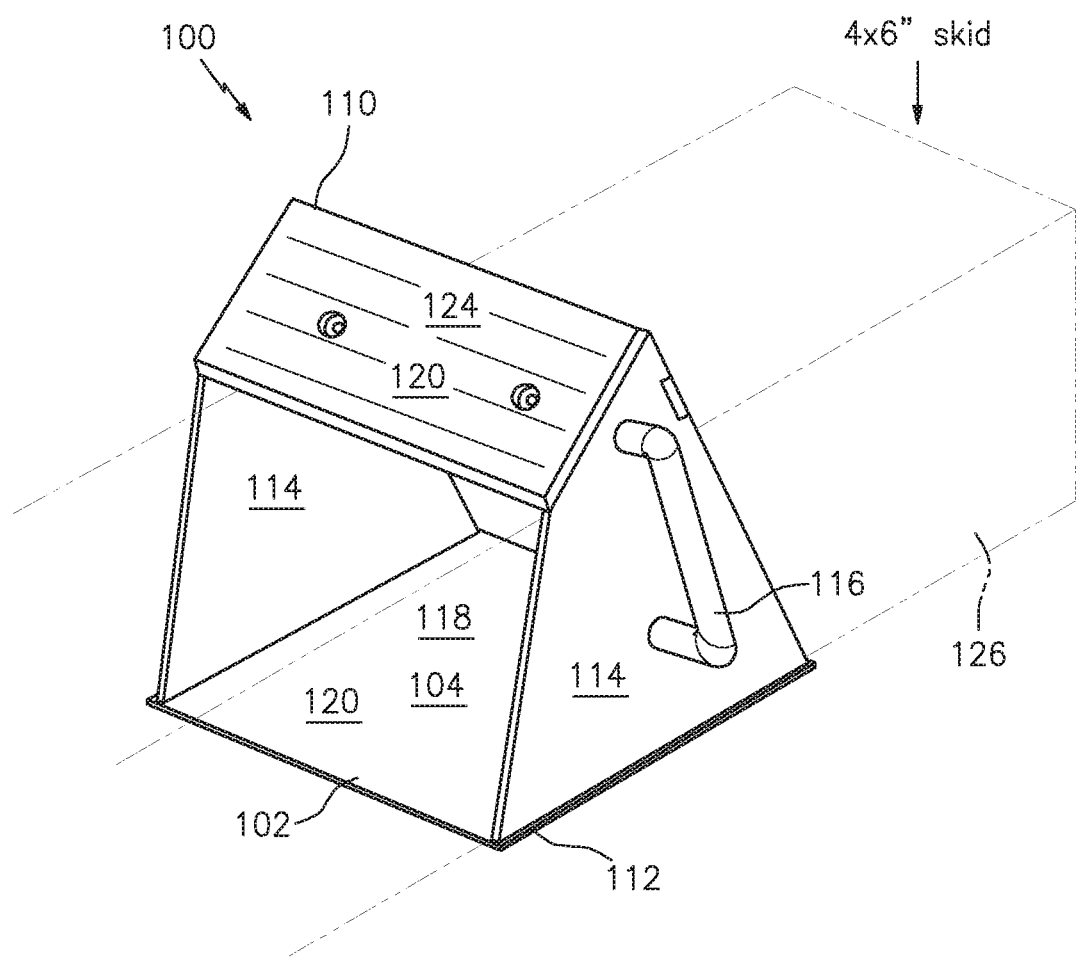
FIG. 10A is top down side isometric view of a support chock associated with an anchor skid, in accordance with one embodiment of the invention
Figure 10B:
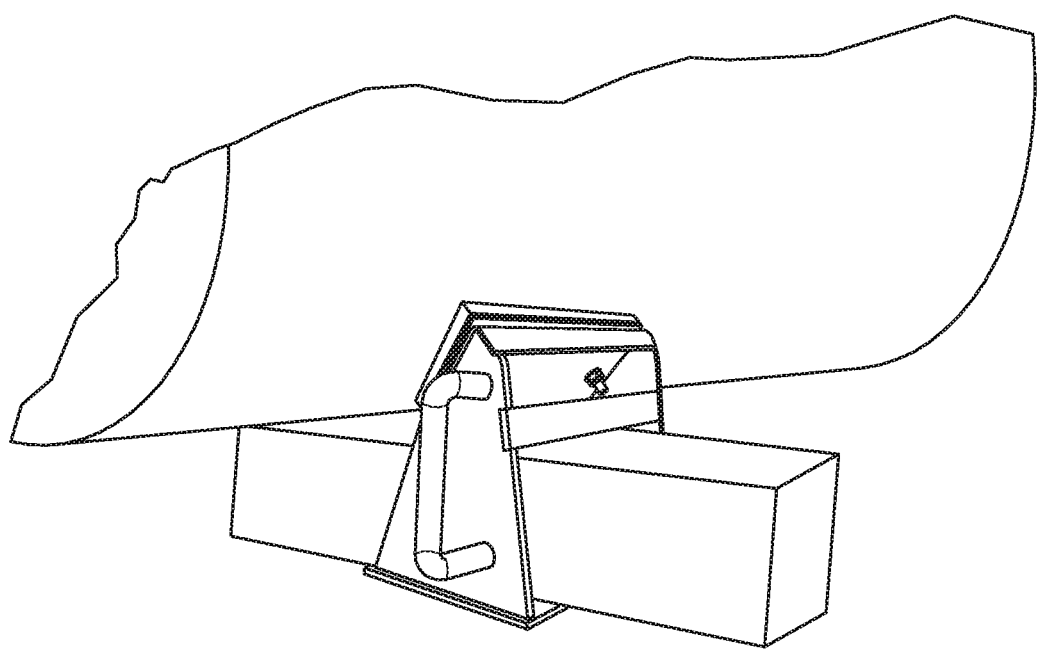
FIG. 10B is rear side view of a support chock associated with an anchor skid.
Figure 11:
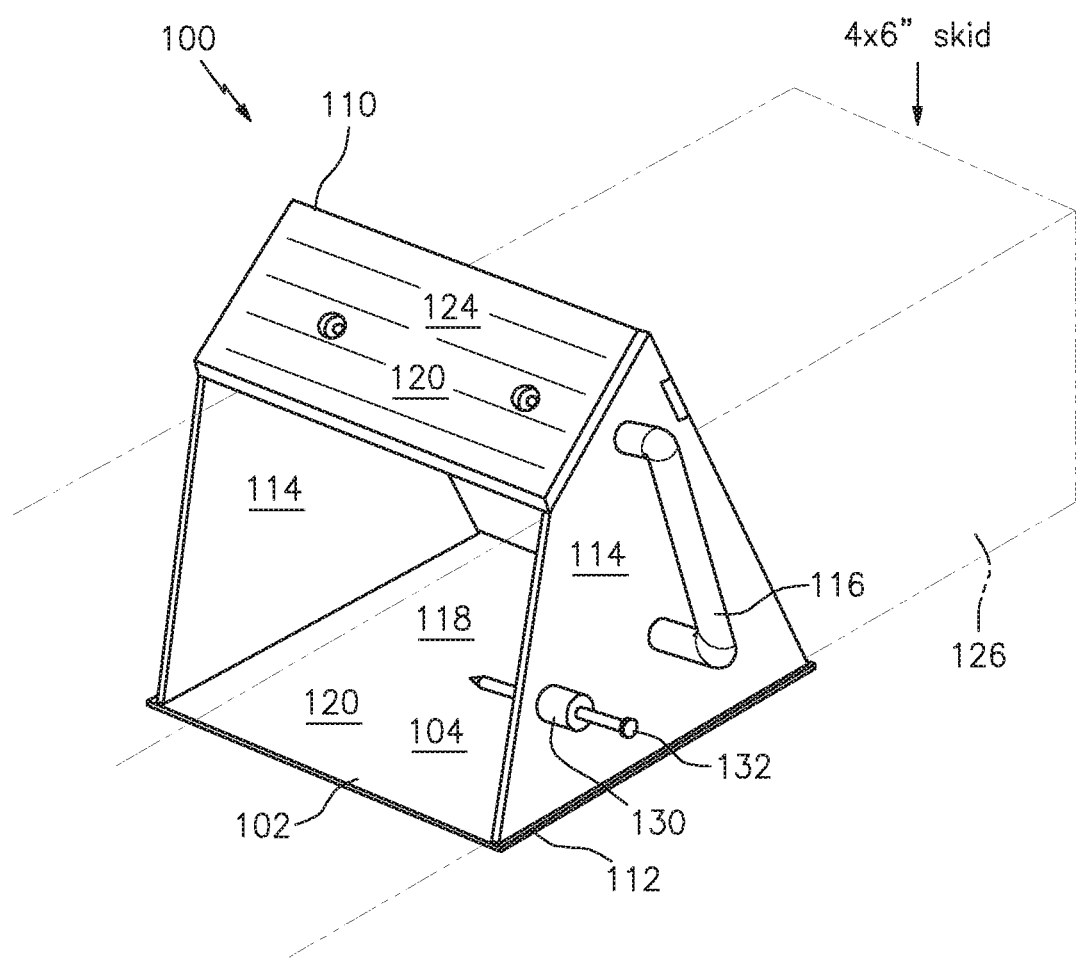
FIG. 11 is top down side isometric view of a support chock associated with an anchor skid and an anchor rod, in accordance with another embodiment of the invention.
Figure 12A:
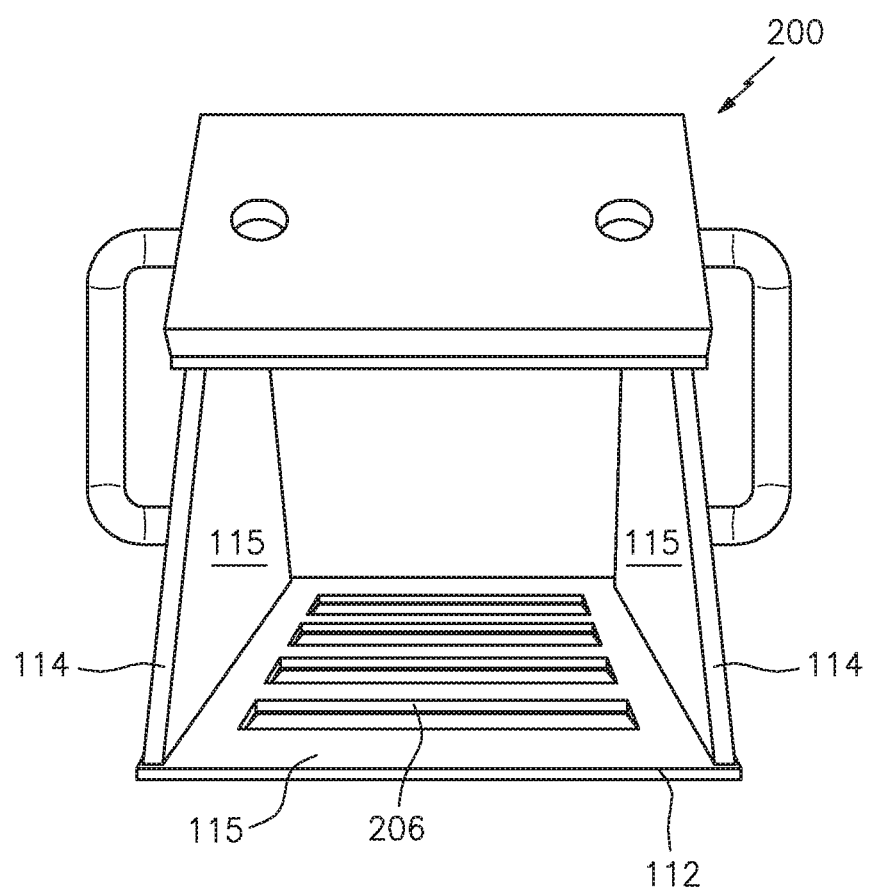
FIG. 12A is a front view of a support chock having traction protrusions/edges, in accordance with one embodiment.
Figure 12B:
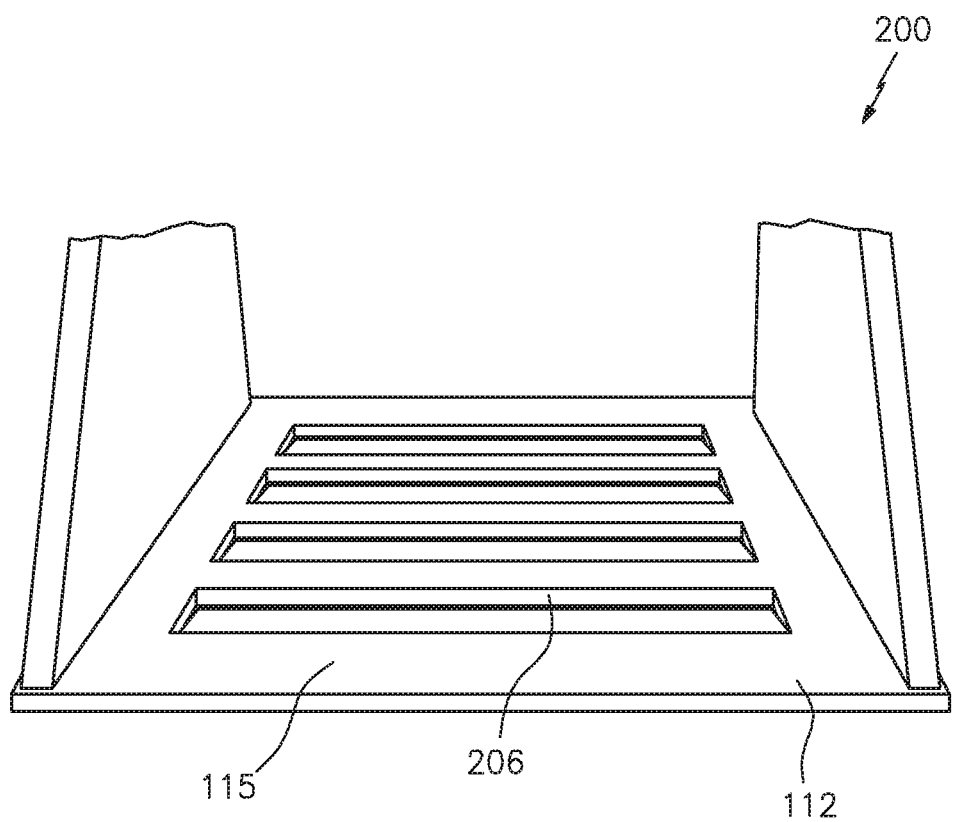
FIG. 12B is a front view of the chock cavity of the support chock of FIG. 12A.
Figure 12C:
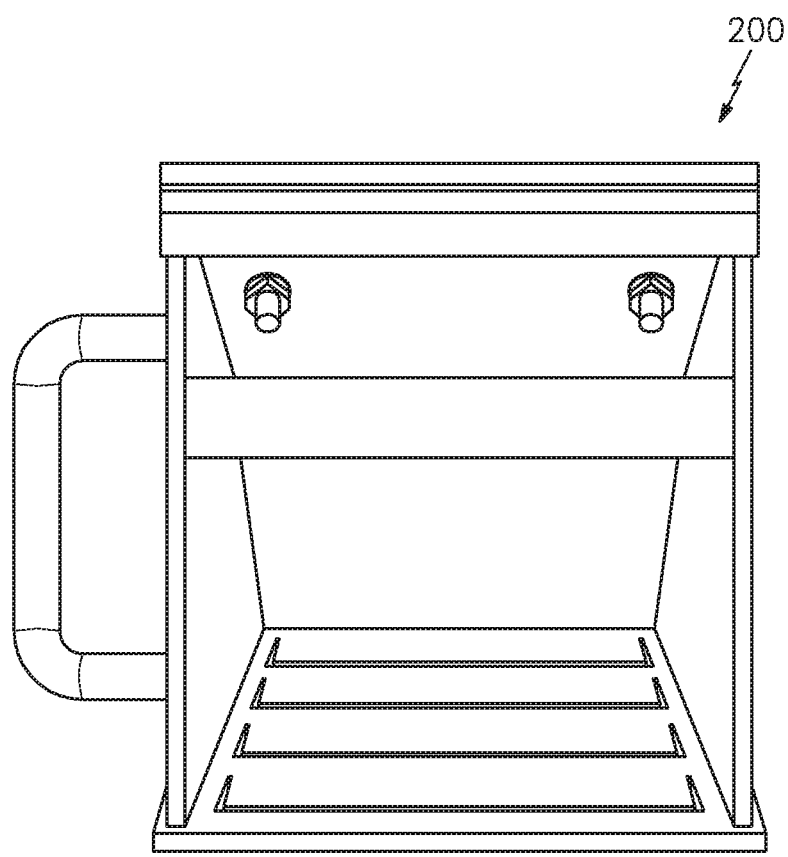
FIG. 12C is a rear view of the support chock of FIG. 12A.
Figure 12D:
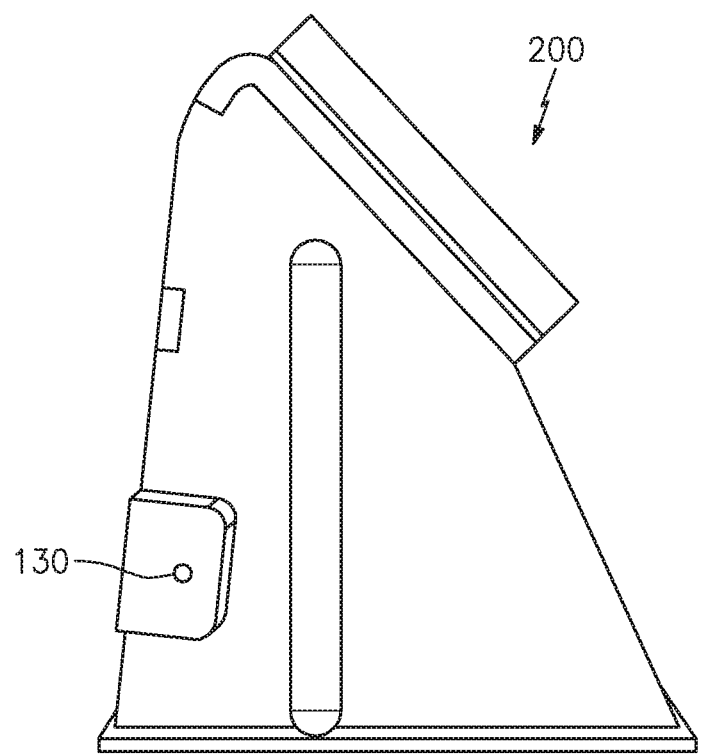
FIG. 12D is a left side view of the support chock of FIG. 12A.
Figure 12E:
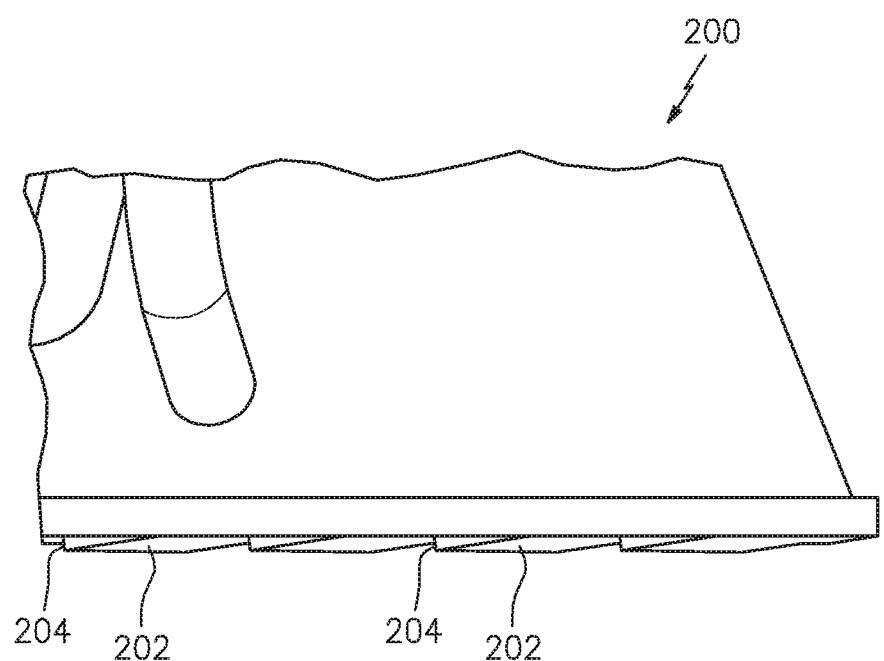
FIG. 12E is a left side bottom view of the support chock of FIG. 12A.
Figure 12F:
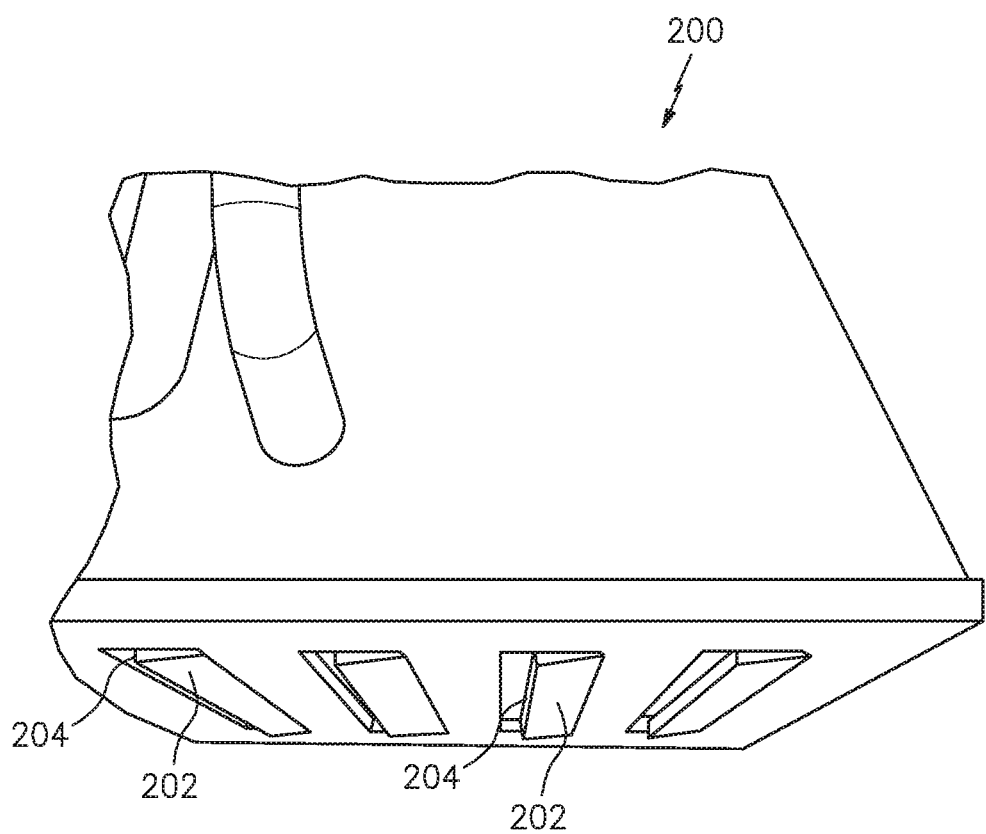
FIG. 12F is a left side bottom view of the support chock of FIG. 12A.

Referring to FIG. 1 to FIG. 8, a support chock 100 for supporting piping, tubing or other articles 140 is provided, in accordance with one embodiment of the invention. The support chock 100 includes a chock front 102 having a chock front opening 104, a chock rear 106 having a chock rear opening 108, a chock top 110, a chock bottom 112, two chock sides 114 and a chock handle 116, wherein the chock handle 116 is located on one of the two chock sides 114 to extend out of the chock side 114. The chock sides 114, chock bottom 112 and chock top 110 define a chock cavity 118, wherein the chock cavity 118 communicates the chock front opening 104 with the chock rear opening 108. The chock front 102 includes a chock front upper portion 120 and a chock front lower portion 122, wherein the chock front upper portion 120 includes is an interface surface 124 upon which the piping, tubing or other articles 140 will be supported and stabilized. Referring to FIG. 10A, it should be appreciated that the chock cavity 118 is sized and shaped to contain an anchor skid 126, such as a 4×6 skid, to help anchor the support chock 100 to a support surface 128. It is contemplated that the support chock 100 may include an anti-skid pad located on the bottom portion of the chock bottom 112 which contacts the support surface 128 to minimize movement of the support chock 100. Referring to FIG. 10A and FIG. 11, one or more of the chock sides 114 may include an anchor rod opening 130 communicated with the chock cavity 118 and an anchor rod 132, wherein the anchor rod 132 may be movably associated with the chock side 114. It should be appreciated that the anchor skid 126 should be sized such that the anchor skid 126 can move into and out of the chock front opening 104 and the chock rear opening 108 to be contained with the chock cavity 118. It should be further appreciated that, in one embodiment, when the anchor skid 126 is located within the chock cavity 118, there is a maximum ⅛ inch space (clearance) between the anchor skid 126 and the chock support member 134 and chock sides 114 (See FIG. 10B). In other embodiments, it is contemplated that any clearance suitable to the desired end purpose may be used. It should be appreciated that when the anchor skid 126 protrudes out of the chock rear opening 108, the support chock 100 is prevented from tilting backward by the chock support member 134 contacting the anchor skid 126.

Figure 1:
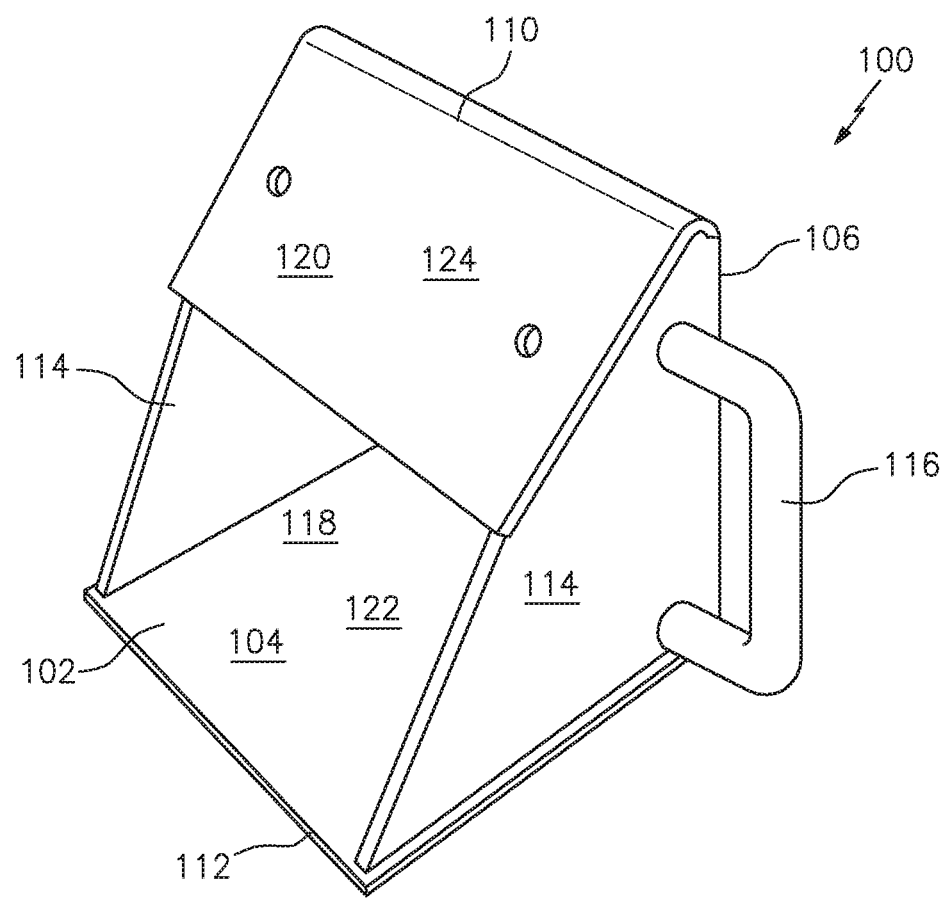
FIG. 1 is a front side perspective view of a support chock, in accordance with one embodiment of the invention.
Figure 2:
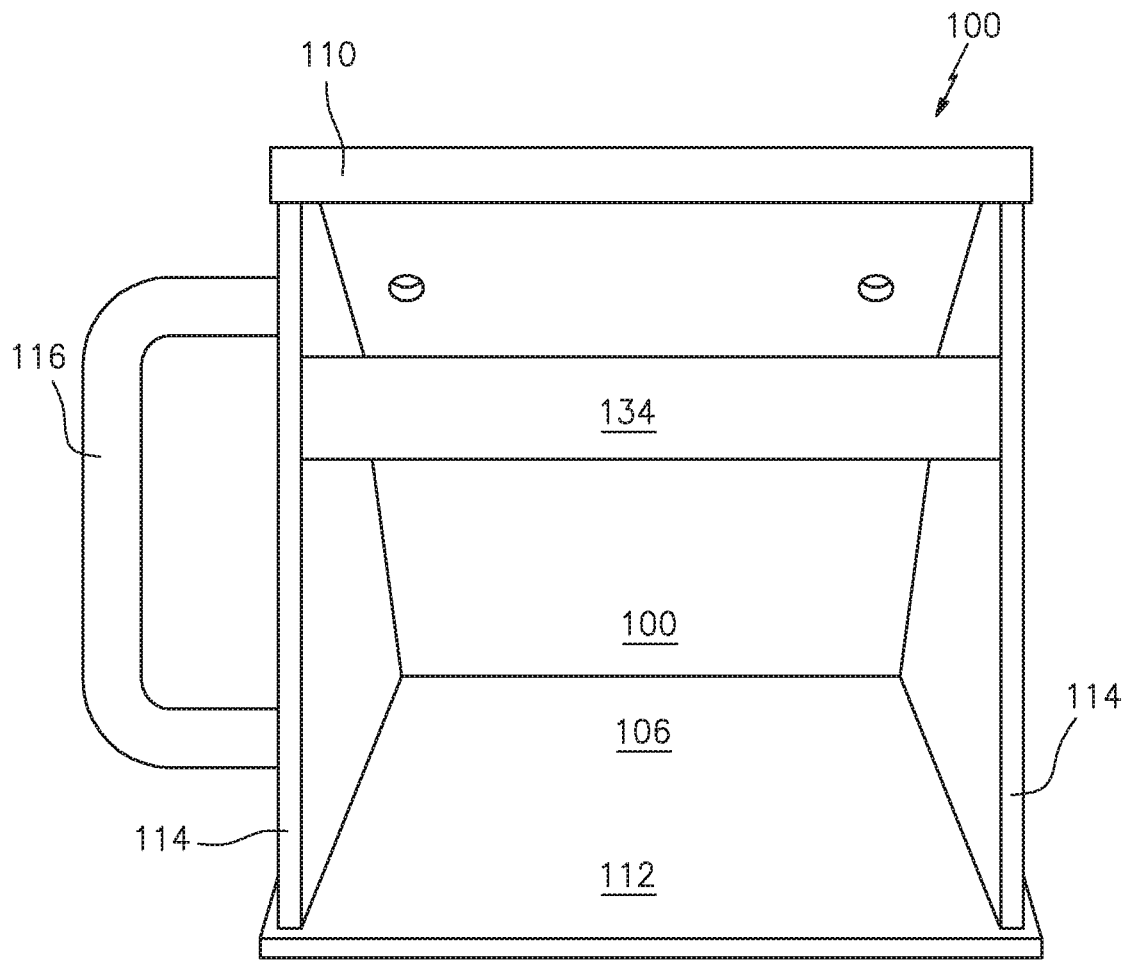
FIG. 2 is a rear view of the support chock of FIG. 1.
Figure 3:
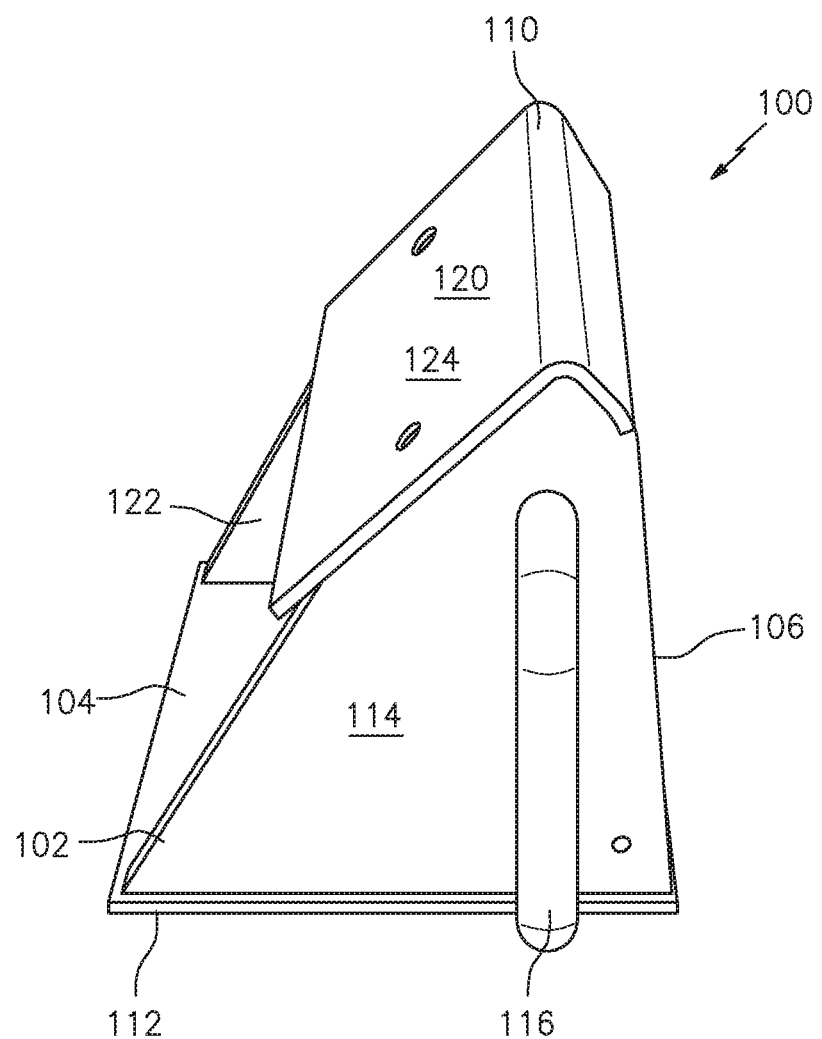
FIG. 3 is a top down side view of the support chock of FIG. 1.
Figure 4:
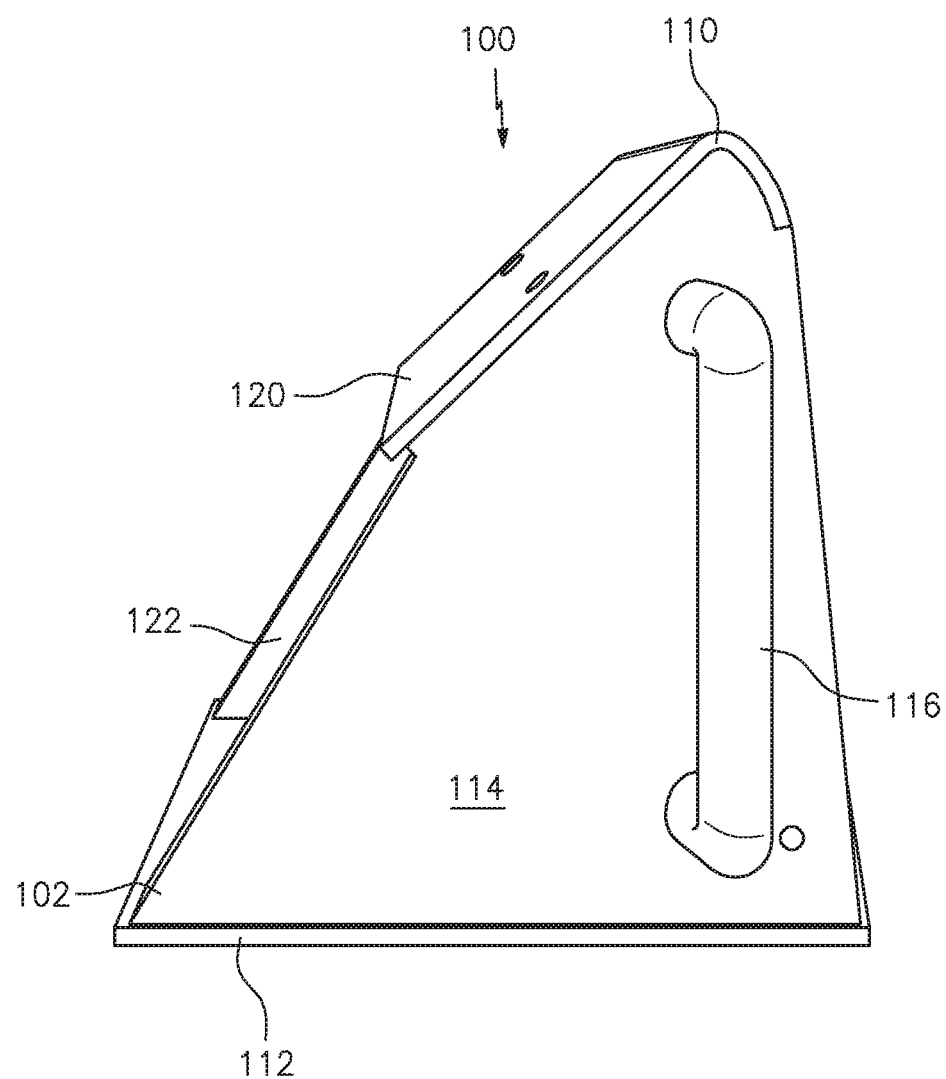
FIG. 4 is a side view of the support chock of FIG. 1.
Figure 5:
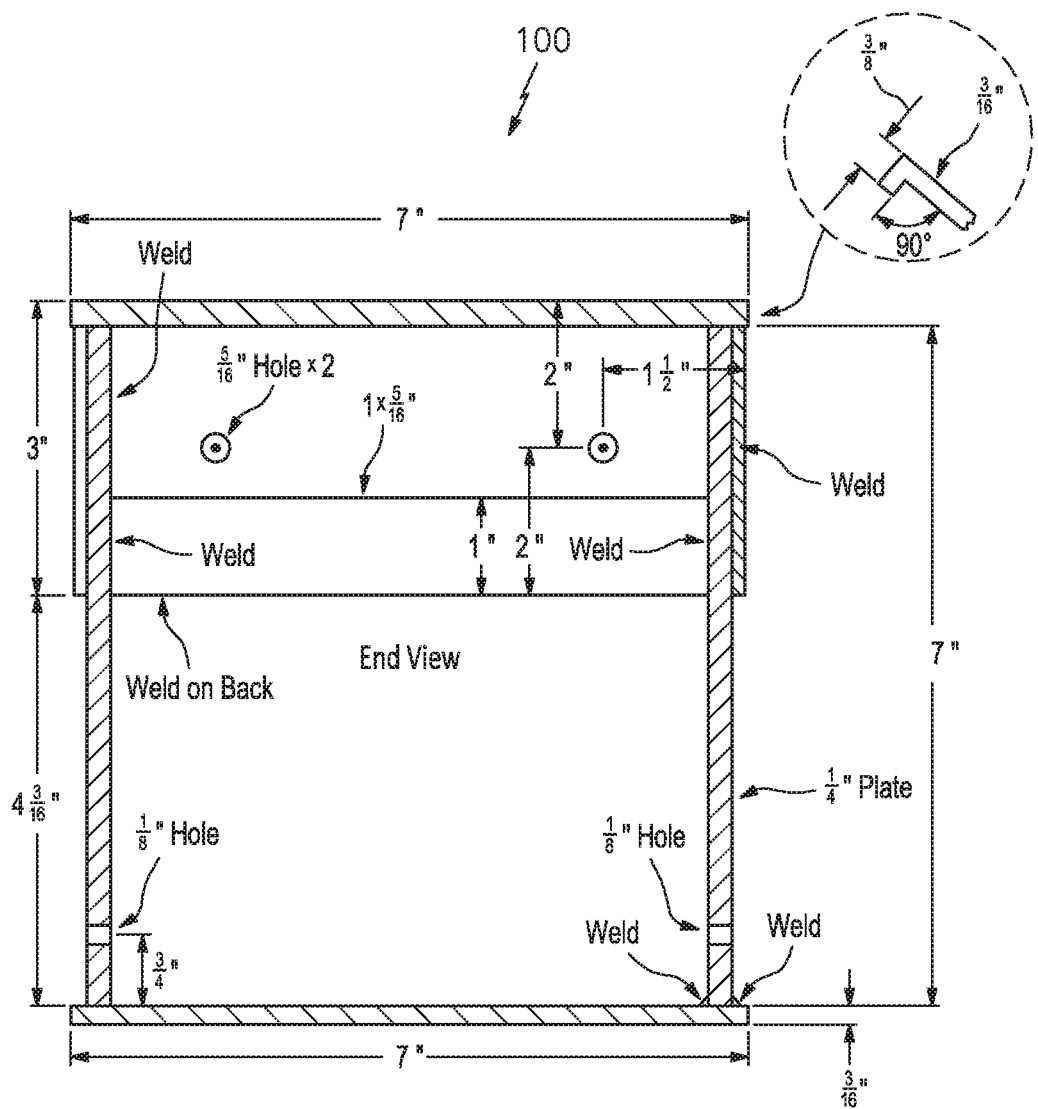
FIG. 5 is a rear view of the support chock of FIG. 1.
Figure 6:
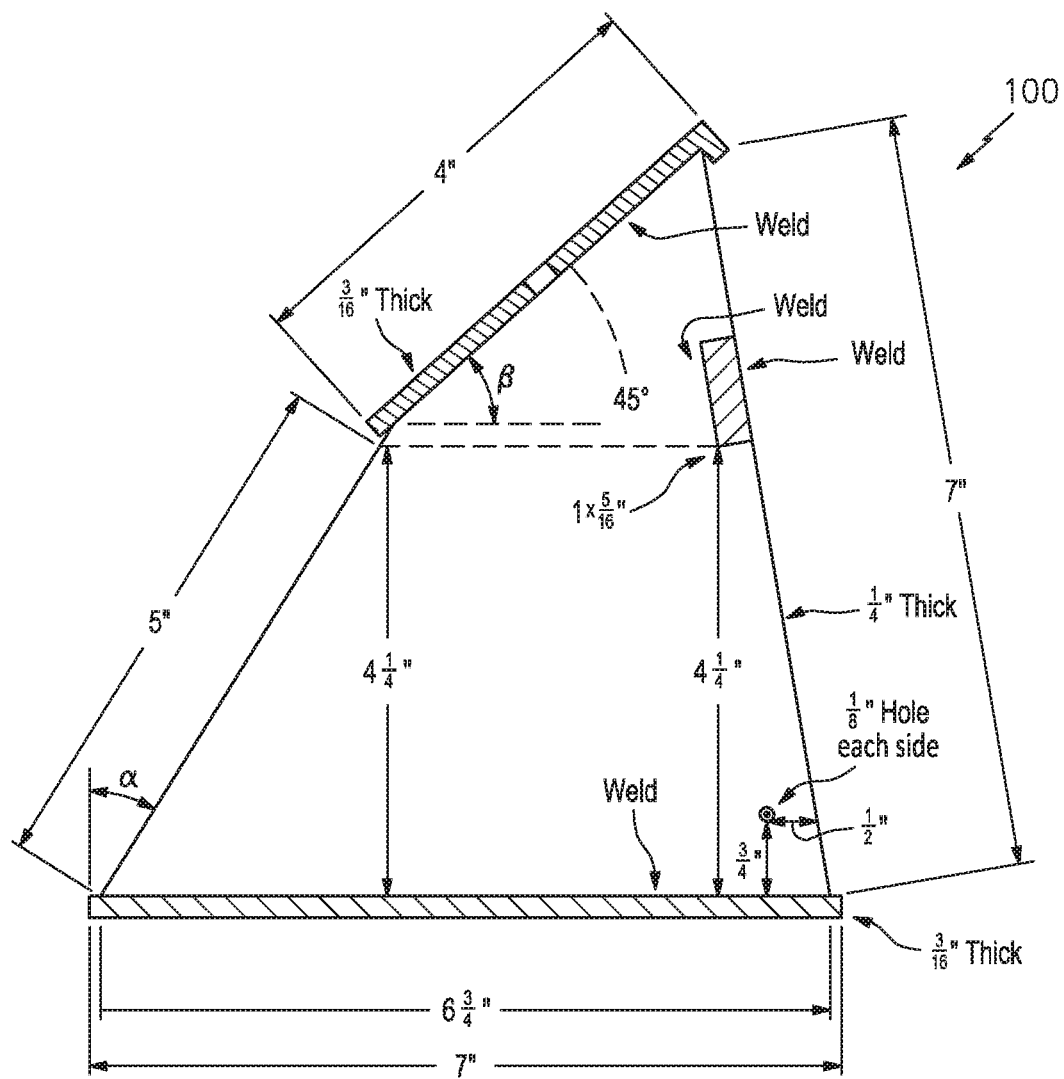
FIG. 6 is a side view of the support chock of FIG. 1.
Figure 7:
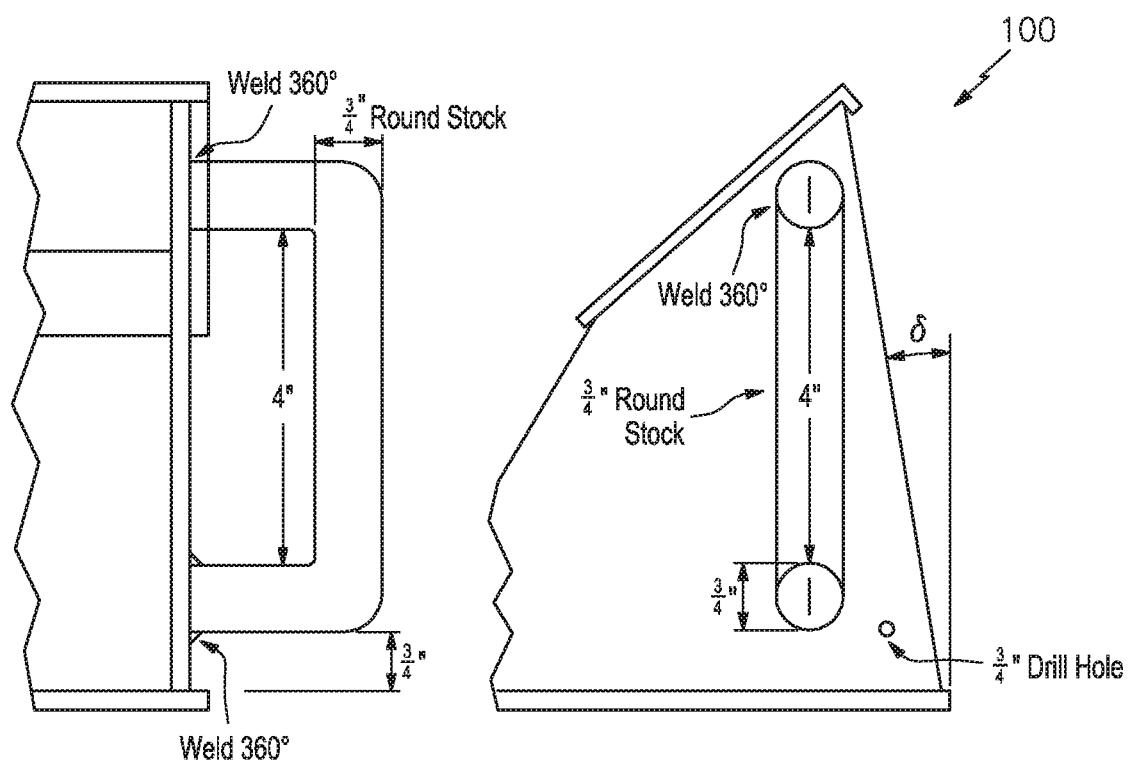
FIG. 7 is a front side and a side view of the support chock of FIG. 1.
Figure 8:
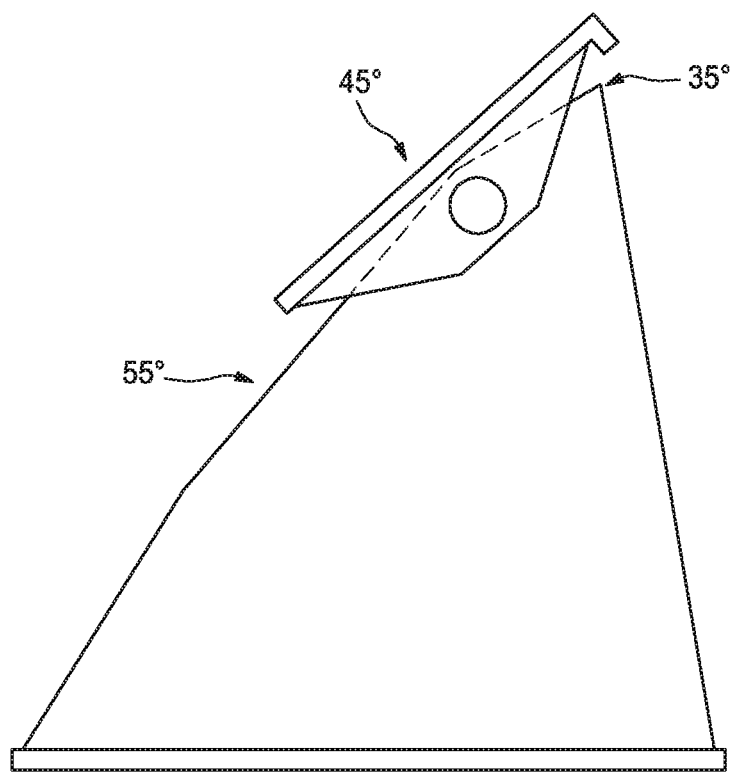
FIG. 8 is a side view of a support chock having a configurable chock front upper portion, in accordance with another embodiment.
Figure 9A:
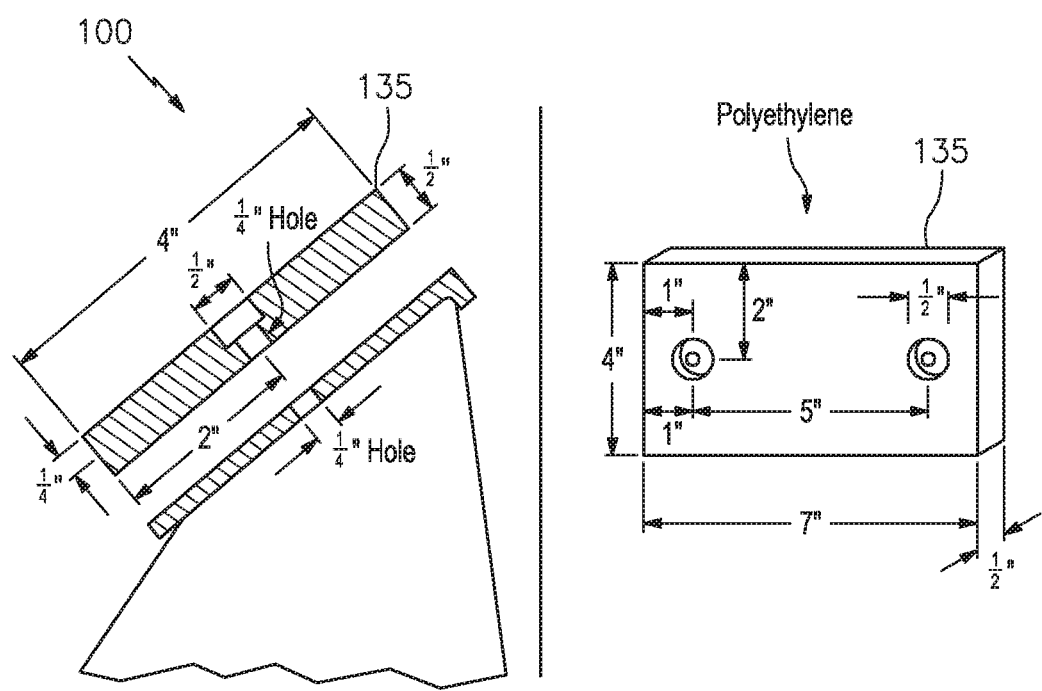
FIG. 9A is a side view of the chock top of the support chock of FIG. 1 having a cover pad, in accordance with one embodiment of the invention.
Figure 9B:
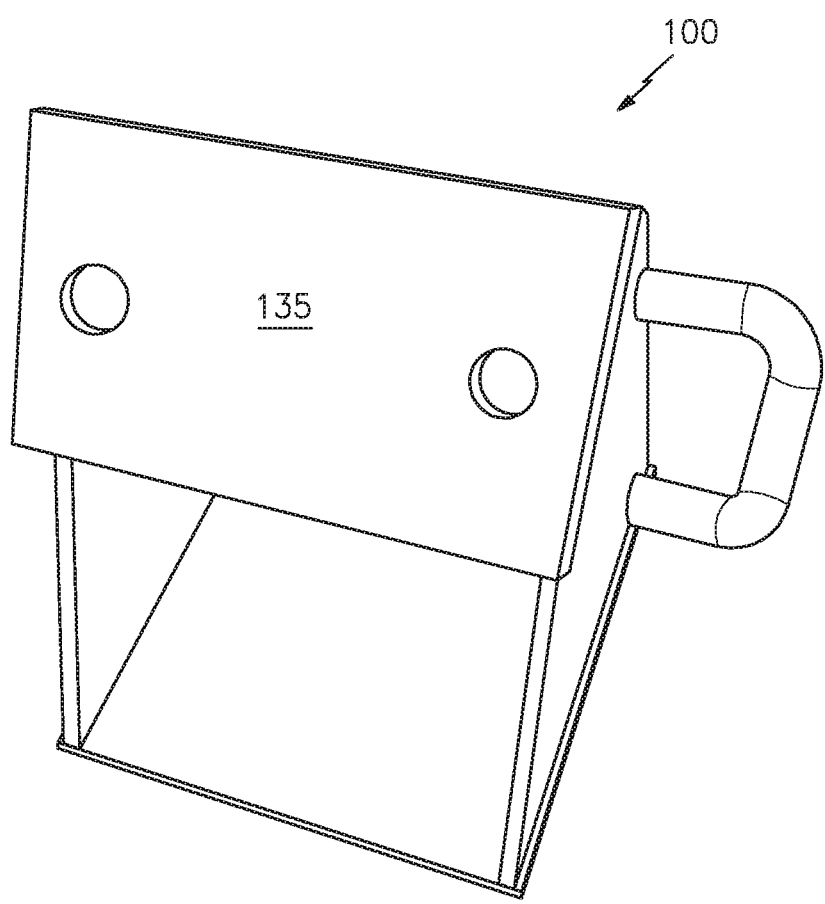
FIG. 9B is a top down front view of the support chock of FIG. 9A.
Figure 9C:
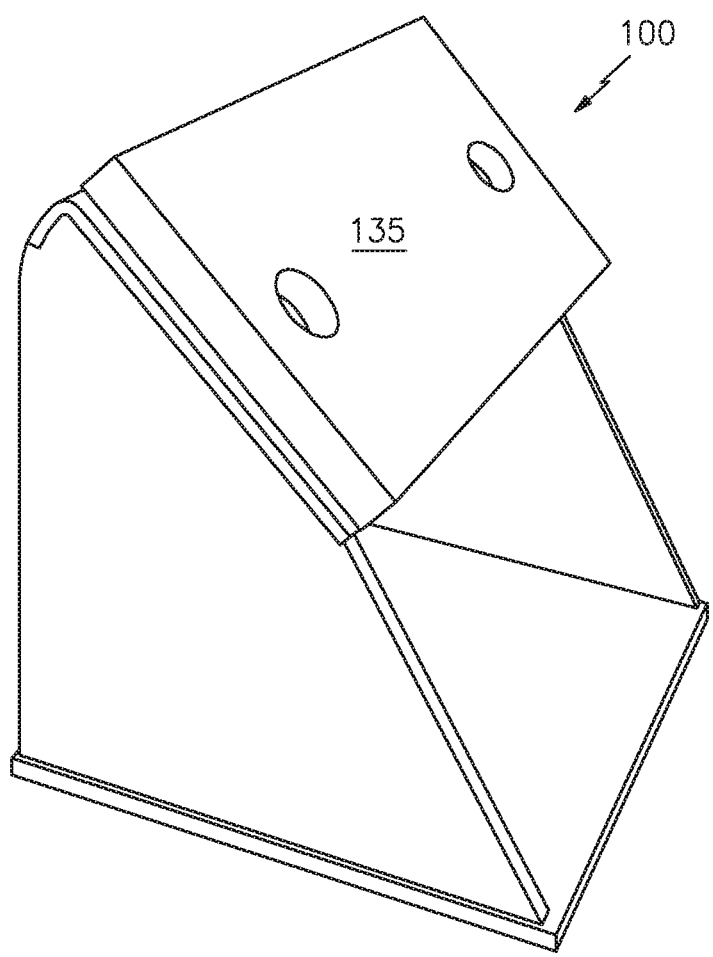
FIG. 9C is a side view of the support chock of FIG. 9A.
Figure 9D:
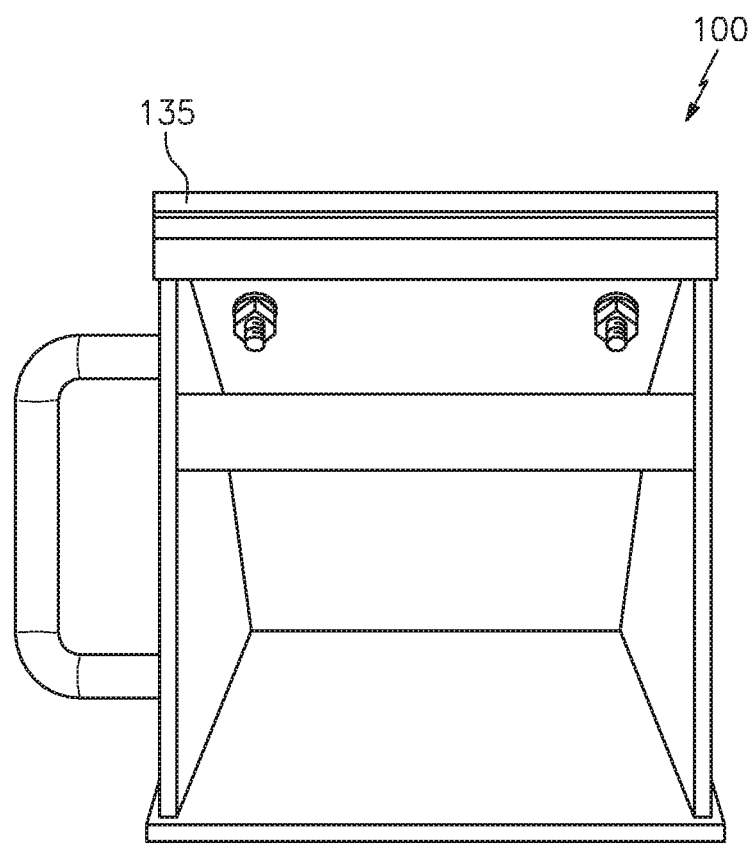
FIG. 9D is a rear view of the support chock of FIG. 9A.
Figure 9E:
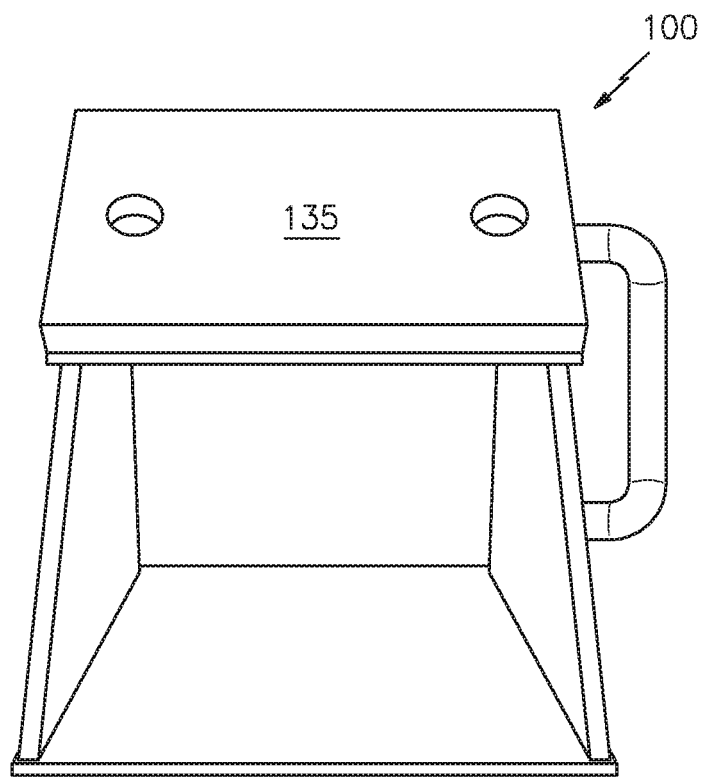
FIG. 9E is a front view of the support chock of FIG. 9A.
Figure 9F:
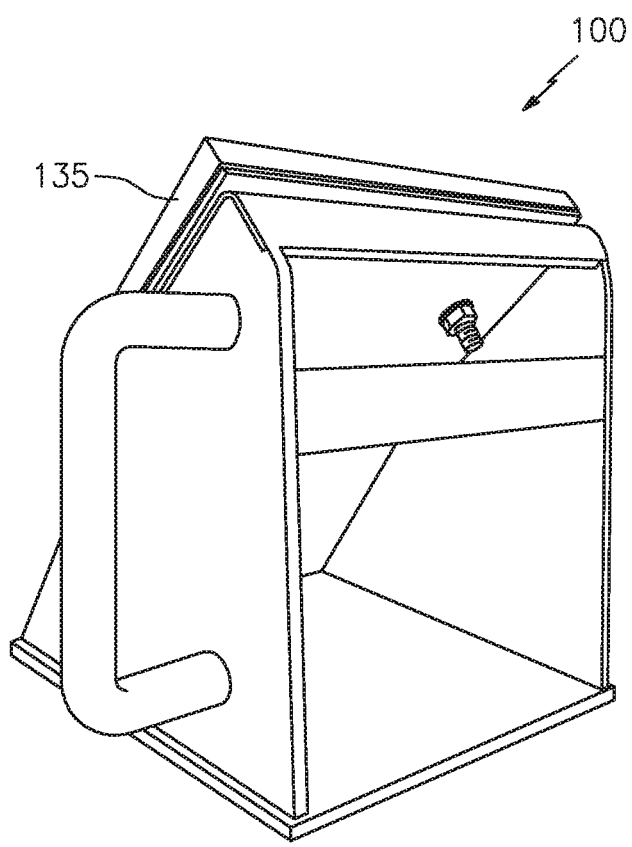
FIG. 9F is a rear side view of the support chock of FIG. 9A.

Referring again to FIG. 4 and FIG. 7, the chock front upper portion 120 is configured to have an angle β of approximately 45 degrees±15 degrees relative to an imaginary plane perpendicular to the chock bottom 112 and the chock front lower portion 122 is configured to have an angle α of approximately 60 degrees±15 degrees relative to an imaginary plane perpendicular to the chock bottom 112. Furthermore, the chock rear 106 is configured to have an angle δ of approximately 15 degrees±15 degrees relative to an imaginary plane perpendicular to the chock bottom 112 The support chock 100 further includes a chock support member 134 associated with the chock rear 106 to traverse the chock rear opening 108. Referring to FIG. 8, it should appreciated that angles β and α may be any angle suitable to the desired end purpose and may have a range between 30 degrees and 60 degrees±15 degrees. In an additional embodiment, it is contemplated that the chock front upper portion 120 (and/or the cover pad 135) may be adjustable or movable such that the angle β is configurable and/or movable between a range of 35 degrees and 55 degrees, ±15 degrees.

Referring to FIGS. 9A to 9F, in one embodiment, the support chock 100 may include an cover pad 135 which may be removably connected to the interface surface 124 of the chock front upper portion 120. The cover pad 135 may be configured to provide impact resistance and protection to the piping, tubing or other articles 140. Additionally, it is contemplated that in some embodiments, the support chock 100 may include one, two or no chock handles 116 and/or the chock handle 116 may be removably associated with the support chock 100 so that the support chock 100 can be used in areas with limited space.

In accordance with the present invention, the support chock 100 is implemented by associating a first support chock 100 with the anchor skid 126. Referring to FIG. 10A and FIG. 10B, this may be accomplished by inserting one end of a first anchor skid 126 into the chock front opening 104 such that a portion of the first anchor skid 126 is located within the chock cavity 118 and such that the chock front 102 is facing the longer end of the first anchor skid 126. The anchor rod 132 is inserted into the anchor rod opening 130 and the anchor rod 132 is compressed (via a hammer or similar device) such that the anchor rod 132 is forced into the first anchor skid 126. This helps to retain the first anchor skid 126 within the chock cavity 118. A second chock support 100 is then associated with the other end of the first anchor skid 126 in a similar fashion as discussed above. This process is repeated until a second anchor skid 136 is associated with a third and fourth support chock 100.

Referring to FIG. 12A to FIG. 12F, it should be appreciated that the support chock 200 in accordance with another embodiment is provided and may include one or more protrusions 202 located on the exterior surface 113 of the chock bottom 112. The one or more bottom protrusions 202 may include an edged surface 204 (and/or other sharp surface) which may be directed toward the chock rear 106 (and/or downward to dig into the support surface) such that any movement of the support chock 100 in the direction of the chock rear 106 causes the edge 204 to dig into the support surface thereby providing lateral support and helping to prevent the support chock 100 from moving laterally. Additionally, the support chock 100 may be configured such that an interior surface 115 of the bottom 112 and/or the chock sides 114 (and/or possibly the chock top) includes one or more top protrusion/edged surface 206 which are directed toward the chock front 102 to engage with the anchor skid 126.

Figure 13:
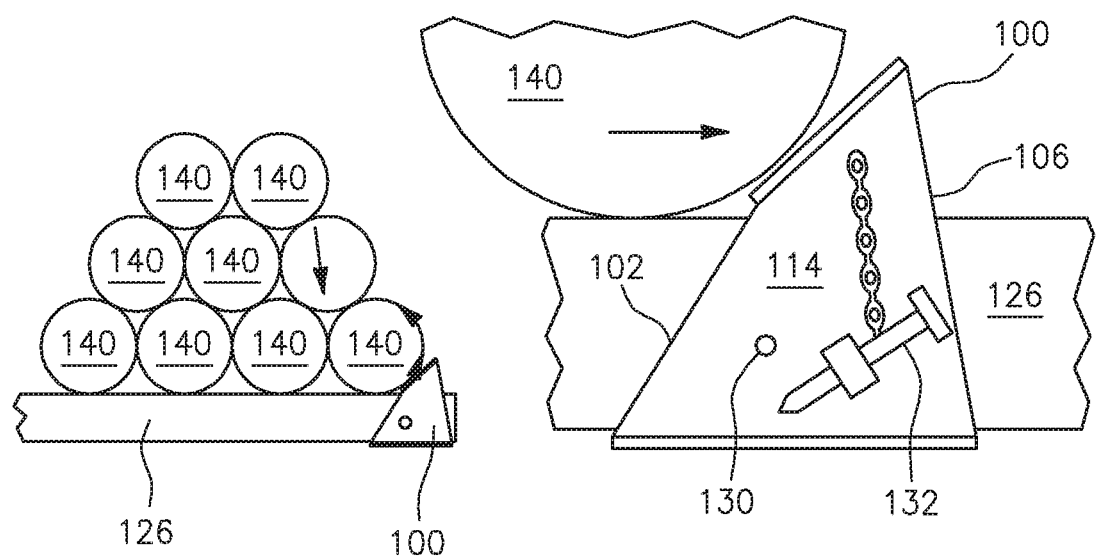
FIG. 13 is an illustration showing a side view of the support chock being used to support piping, tubing or other articles, in accordance with one embodiment of the invention.
Figure 14:
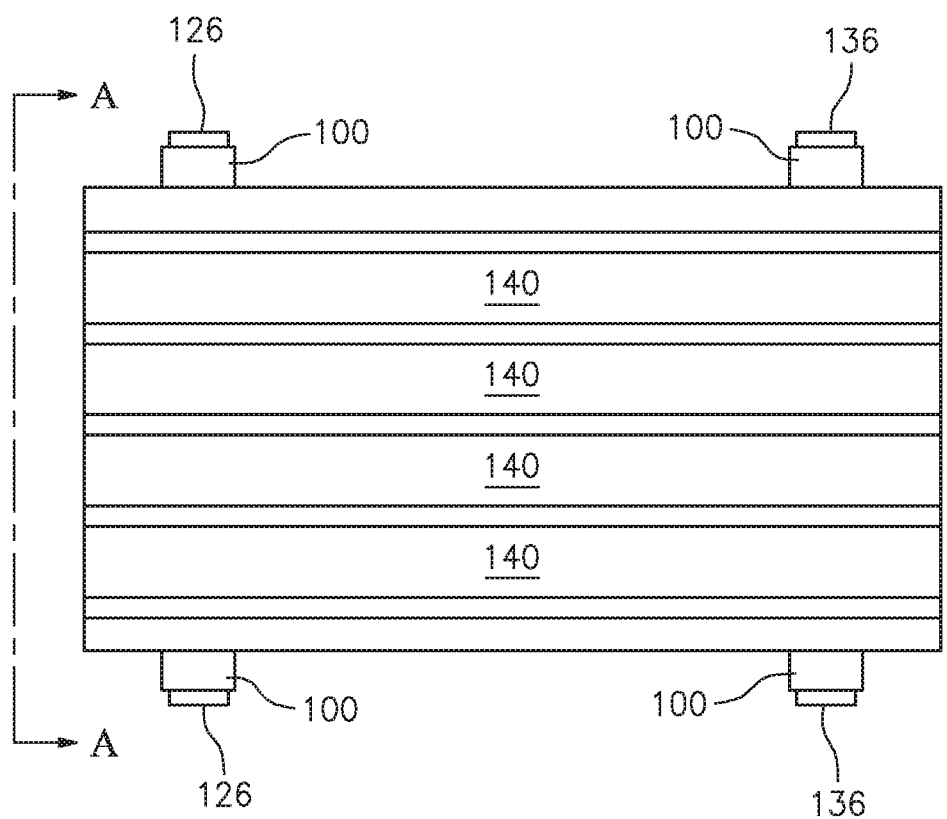
FIG. 14 is an illustration showing a top down view of the support chock being used to support piping, tubing or other articles, in accordance with one embodiment of the invention.
Figure 15:
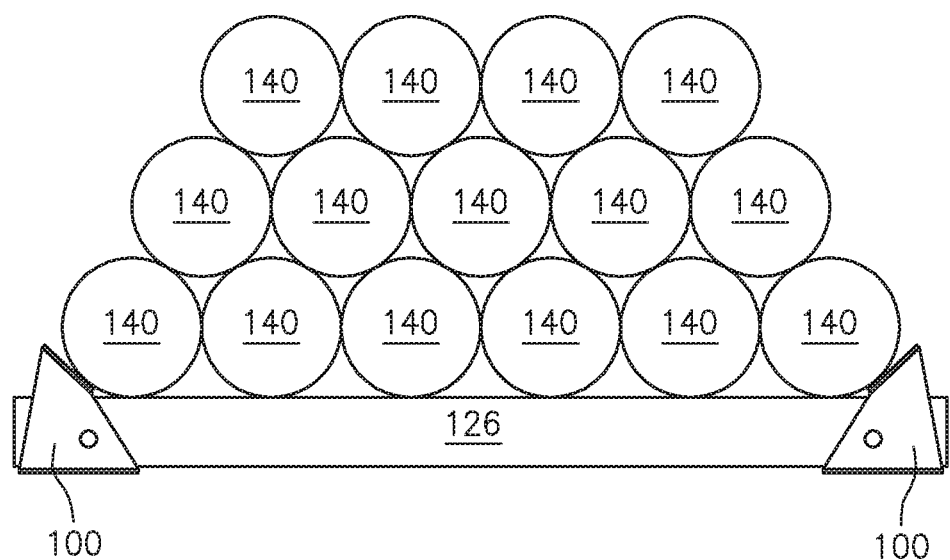
FIG. 15 is an illustration showing a front view of the support chock being used to support piping, tubing or other articles, in accordance with one embodiment of the invention.

Accordingly, referring to FIG. 13, FIG. 14 and FIG. 15, the first anchor skid 126 that is associated with the first and second chock supports 100 is positioned on a stable surface. The first anchor skid 126 that is associated with the first and second chock supports 100 is positioned on the same stable surface to be parallel with the second anchor skid 136. It is contemplated that the stable surface may truck bed for shipping or it may be a platform (or ground) for storage. The piping, tubing or other articles 140 are then associated with the first and second anchor skids 126, 136 such that one end of the piping, tubing or other articles 140 are proximate the first anchor skid 126 and the other end of the piping, tubing or other articles 140 are proximate the second anchor skid 136. It should be appreciated that when associated with the first and second anchor skids 126, 136, the piping, tubing or other articles 140 located on the either edge of bottom row of the stack is in contact with the support chocks 100. This contact prevents the piping, tubing or other articles 140 from rolling thus, allowing the stack to be stable.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, the elements and characteristics of the disclosed and/or contemplated embodiments may be combined in whole or in part and/or many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

I claim:

1. A support chock, comprising:
   a chock front;
   a chock rear;
   a chock top;
   a chock bottom; and
   a plurality of chock sides,
      wherein the chock top, chock bottom and plurality of chock sides define a chock cavity, a chock front opening and a chock rear opening, wherein the chock cavity communicates the chock front opening with the chock rear opening and wherein the chock cavity is configured to contain an anchor skid, and
      wherein the support chock further includes at least one of,
         one or more bottom protrusions are configured to extend downward from the chock bottom,
         one or more top protrusions configured to at least one of,
            extend upward from the chock bottom into the chock cavity, and
            extend outward from the plurality of chock sides into the chock cavity.

2. The support chock of claim 1, wherein chock structure includes a chock front top support surface configured an angle β relative to a support surface, wherein the angle β is about 45 degrees±about 15 degrees.

3. The support chock of claim 2, further comprising a shock absorbing pad, wherein the shock absorbing pad is located on the chock front top support surface.

4. The support chock of claim 1, wherein chock structure includes a chock front top support surface configured an angle β relative to the chock bottom, wherein the angle β is about 45 degrees±about 15 degrees.

5. The support chock of claim 1, further comprising one or more handles located on at least one of the plurality of chock sides.

6. The support chock of claim 1, wherein the one or more bottom protrusions are configured include at least one of an edged surface and a pointed surface.

7. The support chock of claim 1, wherein the plurality of chock sides includes a chock side front portion, wherein the chock side front portion is configured an angle α relative to a vertical plane, wherein the angle α is about 60 degrees±about 15 degrees.

8. The support chock of claim 1, further comprising an anchor skid located within the chock cavity and an anchor rod opening located in at least one of the plurality of chock sides, wherein the anchor rod opening is communicated with the chock cavity and is configured to receive and contain at least one of an anchor rod and a nail.

9. A support chock, comprising:
   a chock structure having a chock bottom, wherein the chock structure defines a chock cavity, a chock front opening and a chock rear opening, wherein the chock cavity communicates the chock front opening with the chock rear opening,
   an anchor skid, and
   wherein the chock structure includes a chock front support surface configured at an angle β relative to the chock bottom and wherein the anchor skid is at least partially located within the chock cavity.

10. The support chock of claim 9, wherein the chock structure includes a chock front, a chock rear, a chock top and a plurality of chock sides.

11. The support chock of claim 10, further comprising one or more handles located on at least one of the plurality of chock sides.

12. The support chock of claim 10, further comprising one or more top protrusions configured to at least one of extend upward from the chock bottom into the chock cavity and extend outward from the plurality of chock sides into the chock cavity.

13. The support chock of claim 10, wherein the plurality of chock sides includes a chock side front portion, wherein the chock side front portion is configured an angle α relative to a vertical plane, wherein the angle α is about 60 degrees±about 15 degrees.

14. The support chock of claim 9, wherein the angle β is about 45 degrees±about 15 degrees.

15. The support chock of claim 9, wherein the chock includes a chock front lower portion, wherein the chock front lower portion is configured to have an angle α of about 60 degrees±15 degrees relative to an imaginary plane perpendicular to the chock bottom.

16. The support chock of claim 9, further comprising one or more bottom protrusions configured to extend downward from the chock bottom.

17. The support chock of claim 16, wherein the one or more bottom protrusions are configured include at least one of an edged surface and a pointed surface.

18. The support chock of claim 9, further comprising a shock absorbing pad, wherein the shock absorbing pad is located on the chock front top support surface.

* * * * *